(12) United States Patent
Saulsbury et al.

(10) Patent No.: US 6,314,510 B1
(45) Date of Patent: Nov. 6, 2001

(54) MICROPROCESSOR WITH REDUCED CONTEXT SWITCHING OVERHEAD AND CORRESPONDING METHOD

(75) Inventors: Ashley Saulsbury, Menlo Park; Daniel S. Rice, Oakland, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/291,811

(22) Filed: Apr. 14, 1999

(51) Int. Cl.[7] .............................. G06F 9/308; G06F 9/345; G06F 13/16
(52) U.S. Cl. .......................... 712/213; 712/228; 712/210; 711/145; 711/156; 711/214; 709/108
(58) Field of Search ................................ 712/32, 239, 43, 712/141, 217, 147, 228, 245, 209, 213, 210, 300; 711/123, 166, 125, 133, 145, 143, 144, 152, 156, 159, 214; 710/267; 709/108

(56) References Cited

U.S. PATENT DOCUMENTS

| 5,825,674 | 10/1998 | Jackson | 364/707 |
| 5,838,962 | * 11/1998 | Larsen | 712/239 |
| 6,145,049 | * 11/2000 | Wong | 710/267 |

FOREIGN PATENT DOCUMENTS

0517282A1  10/1992  (EP).
WO00/33188  6/2000  (WO).

OTHER PUBLICATIONS

"Technique For Reducing The Number Of Registers Saved At A Context Swap," IBM Technical Disclosure Bulletin, vol. 33, No. 3A, Aug. 1, 1990, pp. 234–235.

Garner et al., "The Scalable Processor Architecture (SPARC)," Sun Microsystems, Inc., 1988 IEEE, pp. 278–283.

* cited by examiner

Primary Examiner—Daniel H. Pan
(74) Attorney, Agent, or Firm—Flehr Hohbach Test Albritton & Herbert LLP

(57) ABSTRACT

A microprocessor with reduced context switching overhead and a corresponding method is disclosed. The microprocessor comprises a working register file that comprises dirty bit registers and working registers. The working registers including one or more corresponding working registers for each of the dirty bit registers. The microprocessor also comprises a decoder unit that is configured to decode an instruction that has a dirty bit register field specifying a selected dirty bit register of the dirty bit registers. The decoder unit is configured to generate decode signals in response. Furthermore, the working register file is configured to cause the selected dirty bit register to store a new dirty bit in response to the decode signals. The new dirty bit indicates that each operand stored by the one or more corresponding working registers is inactive and no longer needs to be saved to memory if a new context switch occurs.

9 Claims, 4 Drawing Sheets

MICROPROCESSOR WITH REDUCED CONTEXT SWITCHING OVERHEAD AND CORRESPONDING METHOD

The present invention relates generally to context switching in microprocessors when handling traps. In particular, it pertains to a microprocessor that has reduced context switching overhead for handling traps and a corresponding method for reducing the context switching overhead in a microprocessor.

BACKGROUND OF THE INVENTION

In a conventional microprocessor, the state of the microprocessor must be saved when changing context while handling a trap. A trap may occur due to an interrupt received by the microprocessor from an external device or an exception detected by the microprocessor. This change of context involves saving the operands stored by the working registers of the microprocessor to the main memory of the microprocessor. However, the context switching overhead required to accomplish this operation is large since it is time consuming and a large portion of the main memory is used.

Several solutions have been proposed to reduce the large context switching overhead in a microprocessor. Each of these solutions recognizes that, at the time of a context switch, some of the working registers of the microprocessor contain active operands (i.e., operands still needed by the instruction stream) while others contain inactive operands (i.e., operands no longer needed by the instruction stream). These solutions require tracking of the active operands so that they are saved to the main memory during the next context switch.

One solution is to provide the microprocessor with register windows for the working registers. However, this is a complicated and hardware intensive way to postpone saving of the active operands to main memory until absolutely necessary. Thus, the context switching overhead for this solution is extremely large.

A more efficient solution is to include a dirty bit register for each working register. When a particular working register is written to with a new operand, then the dirty bit stored by the corresponding dirty bit register is set to indicate that the working register is dirty (i.e., has been written to) and stores an active operand that needs to be saved to memory at the next context switch. When the next context switch does occur, the operand is saved to the main memory and the dirty bit is cleared (i.e., re-set).

The problem with this solution is that the operand may have become inactive well before the next context switch even though the dirty bit still indicates that the operand is active. The microprocessor will then needlessly store this inactive operand to the main memory at the next context switch. This may also be the case for many other operands stored by the working registers. Thus, a bottleneck is created in saving these operands at the next context switch. This makes the context switching overhead for this solution unnecessarily large.

SUMMARY OF THE INVENTION

In summary, the present invention comprises a microprocessor with reduced context switching overhead and a corresponding method. The microprocessor comprises a working register file that comprises dirty bit registers and working registers. The working registers including one or more corresponding working registers for each of the dirty bit registers. The microprocessor also comprises a decoder unit that is configured to decode an instruction that has a dirty bit register field specifying a selected dirty bit register of the dirty bit registers. The decoder unit is configured to generate decode signals in response. Furthermore, the working register file is configured to cause the selected dirty bit register to store a new dirty bit in response to the decode signals. The new dirty bit indicates that each operand stored by the one or more corresponding working registers is inactive and no longer needs to be saved to memory if a new context switch occurs.

The previous dirty bit stored by the selected dirty bit register may have indicated that at least one of the one or more corresponding working registers is dirty and stores an operand that is active and needs to be saved to memory at the next context switch. However, all of the operands stored by the one or more corresponding working registers may in fact be inactive. In this case, the context switching overhead in the microprocessor is reduced by storing the new dirty bit in the selected dirty bit register. This is due to the fact that none of the operands will be saved to memory at the next context switch.

DETAILED DESCRIPTION OF THE INVENTION

Figure 1:
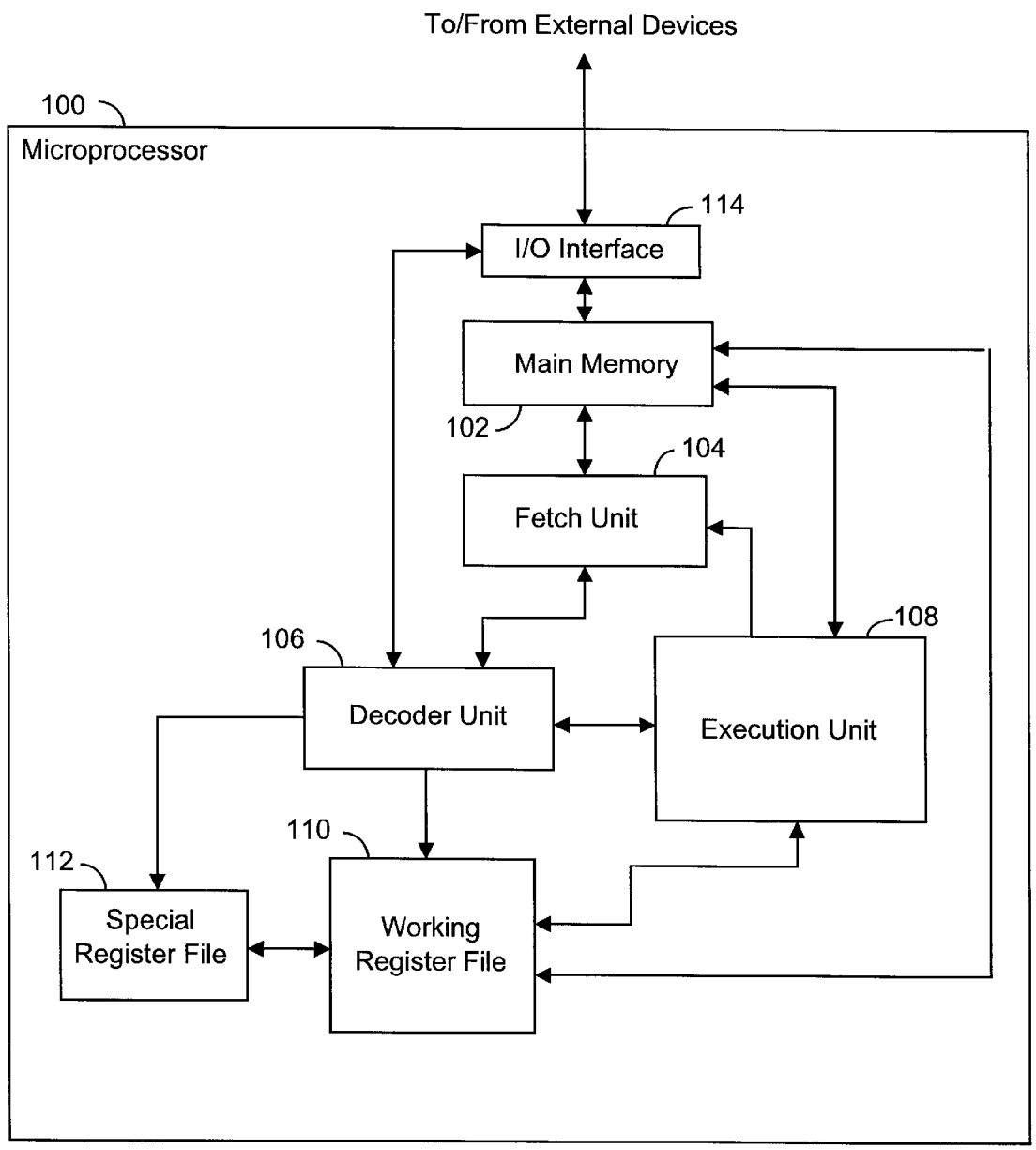
FIG. 1 is a block diagram of a microprocessor in accordance with the present invention.

Referring to FIG. 1, there is shown a microprocessor 100 with reduced context switching overhead for handling traps. The microprocessor 100 executes instructions in an instruction stream. The instructions are stored in the main memory 102 of the microprocessor 100 and fetched from the main memory 102 by the fetch unit 104 of the microprocessor 100. The fetch unit 104 issues the instructions to the decoder unit 106 of the microprocessor 100. The decoder unit 106 decodes the instructions and generates decode signals for controlling the fetch unit 102, the main memory 104, the execution unit 108, the working register file 110, and the special register file 112 of the microprocessor 100 to execute the instructions. The I/O interface 114 of the microprocessor 100 is used to interface with external devices (e.g., secondary memory, graphics card, network card, etc.) for transferring data and instructions.

Figure 2:
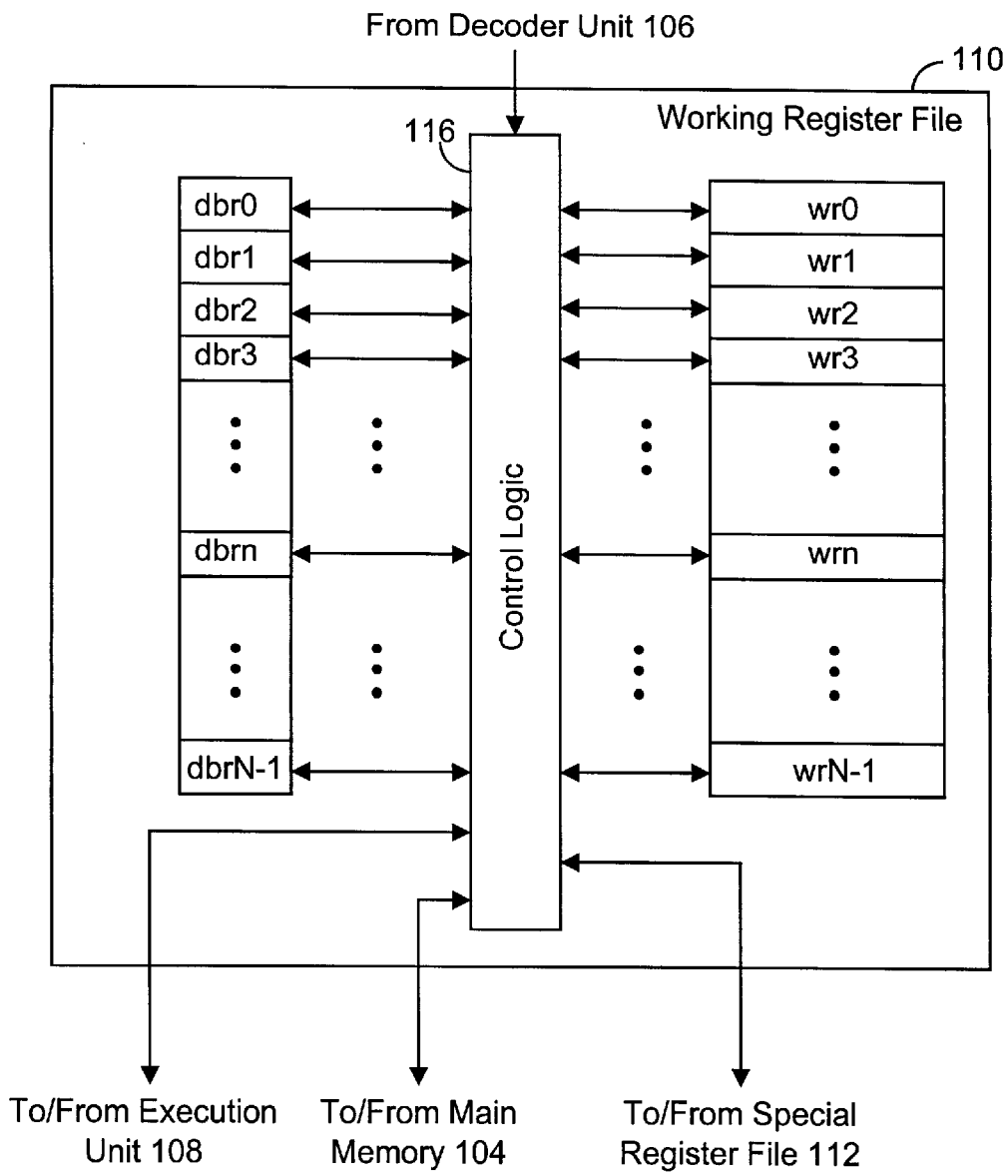
FIG. 2 is a block diagram of one embodiment of the working register file of the microprocessor shown in FIG. 1.

Turning now to FIG. 2, the working register file 110 includes N working registers wr0 to wrN−1 and control logic 116. In response to the decode signals from the decoder unit 106, the control logic 116 generates control signals to cause the working registers wr0 to wrN−1 to store and retrieve the operands used during execution of the instructions. The control logic 116 routes these operands between (i.e., to and from) the working registers wr0 to wrN−1 and the execution unit 108 and the main memory 104.

The working register file 110 also includes N dirty bit registers dbr0 to dbrN−1. For each working register wrn, there is a corresponding dirty bit register dbrn. Each time that the decoder unit 106 decodes an instruction with a destination register field specifying a selected working register wrn as the destination of a new operand, the control logic 116 causes this operand to be stored in the working register wrn. As just alluded to, this is done by providing a control signal to and routing the operand to the working register wrn in response to the decode signals generated by the decoder unit 106 when decoding the instruction. The control logic 116 also causes the dirty bit stored by the corresponding dirty bit register dbrn to be set to indicate that the operand is dirty and active and needs to be saved to the main memory 104 during the next context switch. This is accomplished by providing the dirty bit register dbrn with a new dirty bit having a corresponding binary value (e.g., 1 or 0) and issuing a control signal to the dirty bit register dbrn to store this dirty bit.

The operand stored by the working register wrn may be needed by a later instruction in the instruction stream. This instruction includes a source register field that specifies the working register wrn as the source of the operand. The control logic 116 causes the operand to be retrieved from the working register wrn by providing a control signal to and routing the operand from the working register wrn. This is done in response to the decode signals generated by the decoder unit 106 when decoding the instruction. Although the operand is now inactive, the dirty bit stored by the corresponding dirty bit register dbrn still indicates that it is active and needs to be saved to the main memory 104 at the next context switch.

Figure 3:
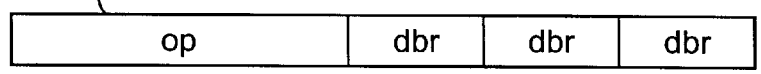
FIG. 3 shows a modified nop instruction that can be executed by the microprocessor shown in FIG. 1.

Thus, t he dirty bits currently stored by all of the dirty bit registers dbr0 to dbrN-1 indicate which of the working registers wr0 to wrN-1 store operands that are to be saved to the main memory 104 at the next context switch. In order to reduce the overhead in doing so, the instruction set for the microprocessor 100 includes the modified nop instruction shown in FIG. 3. This nop instruction has an opcode field op to specify its opcode and one or more dirty bit register fields dbr that each specify a selected dirty bit register dbrn.

As with normal nop instructions, the modified nop instruction is placed in a program by a programmer or compiler to correctly align the instruction stream of the program for issue and execution. Moreover, the programmer or compiler knows when active operands used by the instruction stream become inactive. This enables the programmer or compiler to specify in each of the instruction's dirty bit register fields dbr a corresponding dirty bit register dbrn for a selected working register wrn which stores such an inactive operand.

Referring back to FIG. 1, the decoder unit 106 is specifically configured to decode the modified nop instruction. In doing so, it generates the normal decode signals for executing a normal nop instruction. Turning to FIG. 2, it also generates decode signals that, for each dirty bit register field dbr of the modified nop instruction, cause the control logic 116 to clear the dirty bit stored by the dirty bit register dbrn specified in the dirty bit register field dbr. As a result, this dirty bit then indicates that the operand stored by the corresponding working register wrn is inactive and now does not need to be saved to the main memory 104 during the next context switch. The working control register logic 116 does this by providing the dirty bit register dbrn with a new dirty bit having a corresponding binary value (e.g., 0 or 1) and issuing control signals to the dirty bit register dbrn to store this dirty bit. Then, during the next context switch, this operand will not be saved to the main memory 104 since the dirty bit stored by the dirty bit register dbrn indicates that it need not be saved.

By using the modified nop instruction in this manner, the number of operands that are identified by the dirty bit registers dbr0 to dbrN-1 as being active at the time of the next context switch is reduced. This reduces the number of operands that need to be saved to the main memory 104 at the next context switch. As a result, the context switching overhead of the microprocessor 100 is reduced since the time and the amount of main memory 104 needed to perform the context switch is reduced.

Figure 4:
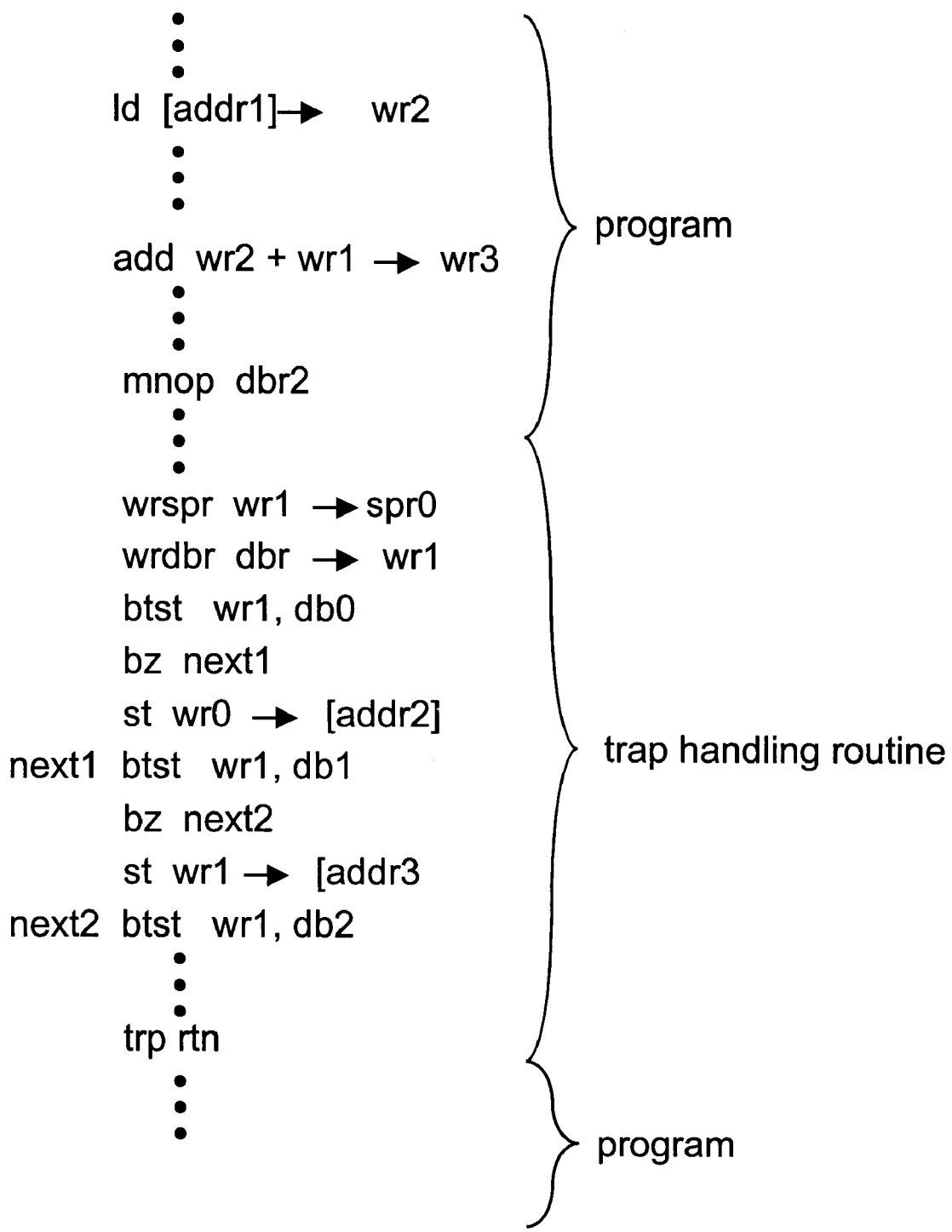
FIG. 4 shows instructions, including the nop instruction shown in FIG. 3, of a program and a trap handling routine that are executed by the microprocessor of FIG. 1.

In order to illustrate this more effectively, FIG. 4 provides an example of an program and a trap handling routine executed by the microprocessor 100. Referring also to FIG. 2, the program includes a load instruction ld to load the operand stored at an address addr1 of the main memory 104 into the working register wr2. Since the working register wr2 is specified as the destination for the operand, the dirty bit stored by the corresponding dirty bit register dbr2 for the working register wr2 is set to indicate that the operand is active. Later, an addition instruction add in the program causes the operands stored by the working registers wr2 and wr1 to be added together with the resulting operand being stored in the working register wr3. The operand stored by the working register wr2 is now inactive since it is not used by later instructions in the instruction stream of the program. Then, a modified nop instruction mnop in the program is executed. The modified nop instruction mnop specifies the dirty bit register dbr2. It is used not only to align the instructions of the program, but also to clear the dirty bit register dbr2.

After the modified nop instruction is executed, a trap may occur. In this case, the microprocessor 100 transfers execution from the program to a conventional trap handling routine. The write special register instruction wrspr in the trap handling routine causes the operand stored by the working register wr1 to be saved in a special register sp0 of the special register file 112. The write dirty bit registers instruction wrdbr then causes the dirty bits stored by the dirty bit registers dbr0 to dbrN-1 to be stored in the working register wr1. Once this has been done, the bit test instruction btst determines if the dirty bit stored by the dirty bit register dbr0 is zero or one. If the dirty bit is zero, this indicates that the operand stored by the working register wr0 is inactive. In this case, the trap handling routine branches to the bit test instruction btst at the label next1 as a result of the branch on zero instruction bz. Thus, the operand stored by the working register wr0 is not saved to the main memory 104 because it has become inactive. But, if the dirty bit is one, then this indicates that the operand is active. In this case, the trap handling routine does not branch and the store instruction st causes the operand stored in the working register wr0 to be saved in the main memory 104 at the address addr2.

The trap handling routine then continues this process for each of the remaining dirty bits stored by the dirty bit registers dbr1 to dbrN-1. By doing so, inactive operands identified by the dirty bits in the dirty bit registers dbr0 to dbrN-1 are not saved to the main memory 104 at the next context switch. This reduces the amount of traffic in the main memory 104 required to save the active operands identified by the dirty bits. In this way, the context switching overhead of the microprocessor 100 is reduced. When the trap handling routine is finished, the trap return instruction trp rtn causes the microprocessor 100 to transfer execution back to the program and also causes the dirty bits stored by the dirty bit registers dbr0 to dbrN-1 to be cleared for the next context switch.

As may be evident from the foregoing, not all of the dirty bits for operands that become active after the previous context switch and inactive before the next context switch can actually be cleared before the next context switch. This may be due to the fact that there may be few slots to insert the modified nop instruction in the instruction stream of the program. However, these operands will nevertheless be conservatively saved to the main memory 104 by the trap handling routine. Thus, the inclusion of the modified nop instruction will not adversely affect execution of the program after context switching in the microprocessor 100.

It is possible that a programmer will mistakenly insert a modified nop instruction to clear a dirty bit stored by one of the dirty bit registers dbr0 to dbrN−1 that actually should not be cleared. This is a software error and should not be done. The result is that one of the working registers wr0 to wrN−1 may randomly receive the wrong operand when a context switch occurs. However, this effect is restricted to the programmer's program and nothing else in the microprocessor 100 is affected.

It is also possible that the programmer will want to issue a normal nop instruction without clearing any dirty bits stored by the dirty bit registers dbr0 to dbrN−1. In order to consider this possibility, the instruction set of the microprocessor 100 may include both a normal nop instruction and the modified nop instruction just described. In this case, the normal and modified nop instructions would have different opcodes. The decoder unit 106 would then be configured to decode both types of nop instructions in order to distinguish and execute them properly.

Alternatively, if the microprocessor 100 has a SPARC architecture, the working register wr0 is always hard wired to contain an operand with a value of zero and is unaffected by the value of the dirty bit stored by the corresponding dirty bit register dbr0. Therefore, if the programmer wishes to implement a normal nop with the modified nop instruction, then the programmer need only specify the dirty bit register dbr0 in the dirty bit register field dbr of the modified nop instruction. As a result, the dirty bits stored by the other dirty bit registers dbr1 to dbrN−1 will be left unchanged. In this way, the instruction set for the microprocessor 100 only requires one nop instruction.

Figure 5:
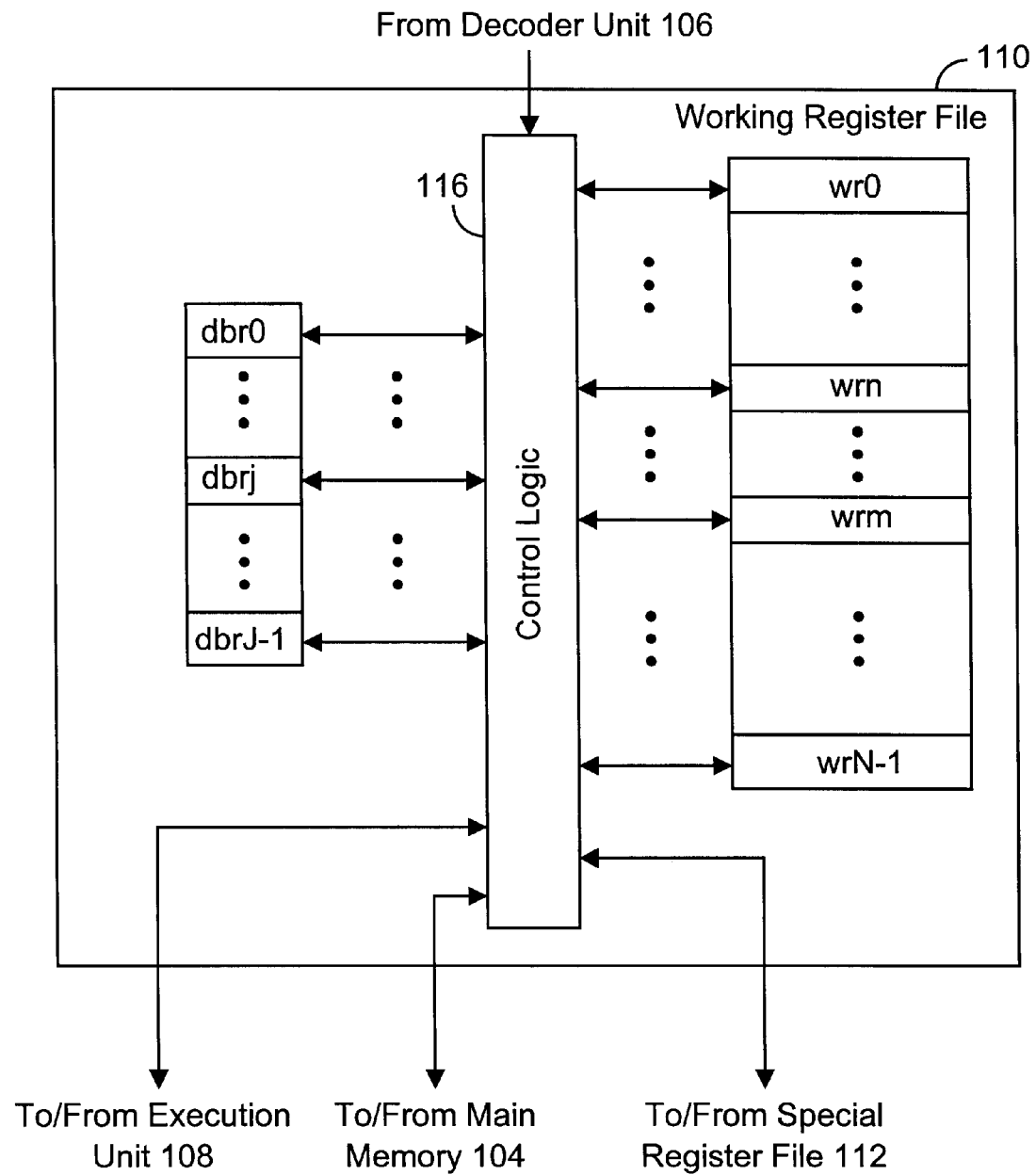
FIG. 5 is a block diagram of another embodiment of the working register file of the microprocessor shown in FIG. 1.

Additionally, referring to FIG. 5 and in contrast to FIG. 2, the working registers wr0 to wrN−1 may be organized into sets with each set having multiple working registers wrn to wrm. In this case, there are only J dirty bit registers dbr0 to dbrJ−1 so that there is a corresponding dirty bit register dbrj for each set of working registers wrn to wrm. Each time that a new operand is stored in one of the working registers wrn to wrm of a set, then the dirty bit of the corresponding dirty bit register dbrj is set to indicate that at least one of the operands stored by the working registers wrn to wrm of the set is active. The modified nop instruction will then be used to clear this dirty bit only when all of the working registers wrn to wrm in the set store operands that are inactive. But, all of the operands stored by the working registers wrn to wrm in the set will be saved to the main memory 104 if the dirty bit indicates that at least one of them is still active. As in the case where there is one corresponding dirty bit register dbrn for each working register wrn, the programmer or compiler will determine when all of the operands stored by the working registers wrn to wrm in the set have become inactive. And, the control logic 116 causes the setting and clearing of the dirty bit for these operands to be accomplished in the same manner as that described earlier.

In the foregoing discussion, a modified nop instruction is used to reduce the context switching overhead of the microprocessor 100. This is due to the fact that the modified nop instruction has unused bits which can serve as the dirty bit field dbr and because the modified nop instruction can be conveniently inserted in a program without affecting the performance of the program. However, other instructions that would normally be used in a program and that have unused bits can be modified so that the unused bits serve as the dirty bit field dbr. In this way, such an instruction could be used in addition to or in lieu of the modified nop instruction to clear the dirty bits stored by the dirty bit registers dbr0 to dbrN−1 in a similar manner to that described earlier.

Finally, while the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A microprocessor with reduced context switching overhead, the microprocessor comprising:
   a working register file comprising:
      dirty bit registers;
      working registers including only one corresponding working register for each of the dirty bit registers; and
   a decoder unit configured to:
      decode an instruction that has a dirty bit register field specifying a selected dirty bit register of the dirty bit registers; and
      generate decode signals in response;
   the working register file being configured to, in response to the decode signals, cause the selected dirty bit register to store a new dirty bit indicating that each operand stored by the corresponding working register is inactive and no longer needs to be saved to memory at a next context switch of the microprocessor.

2. A microprocessor as recited in claim 1 wherein the instruction is a modified nop instruction modified to include the dirty bit register field.

3. A microprocessor as recited in claim 1 wherein the working registers include a working register that is hard wired to store an operand with a zero value.

4. A microprocessor as recited in claim 1 wherein the working register file comprises control logic configured to, in response to the decode signals:
   provide a new dirty bit indicating that each operand stored by the corresponding working register is inactive and no longer needs to be saved to memory at the next context switch of the microprocessor; and
   generate a control signal to cause the selected dirty bit register to store the new dirty bit.

5. A method for reducing context switching overhead in a microprocessor, the microprocessor comprising dirty bit registers and only one corresponding working register for each of the dirty bit registers, the method comprising the steps of:
   decoding an instruction that has a dirty bit register field specifying a selected dirty bit register of the dirty bit registers; and
   in response to the decoding step, storing in the selected dirty bit register a new dirty bit indicating that each operand stored by the corresponding working register is inactive and no longer needs to be saved to memory at a next context switch of the microprocessor.

6. A method as recited in claim 5 wherein the instruction is a modified nop instruction modified to include the dirty bit register field.

7. A method as recited in claim 5 wherein the only one corresponding working register includes a working register that is hard wired to store an operand with a zero value.

8. A microprocessor with reduced context switching overhead, the microprocessor comprising:
   a working register file comprising:
      dirty bit registers;
      working registers including multiple corresponding working registers for each of the dirty bit registers; and
   a decoder unit configured to:
      decode an instruction that has a dirty bit register field specifying a selected dirty bit register of the dirty bit registers; and
      generate decode signals in response;
   the working register file being configured to, in response to the decode signals, cause the selected dirty bit register to store a new dirty bit indicating that each operand stored by one of the multiple corresponding working registers is inactive and no longer needs to be saved to memory at the next context switch of the microprocessor.

9. A method for reducing context switching overhead in a microprocessor, the microprocessor comprising dirty bit registers and multiple corresponding working registers for each of the dirty bit registers, the method comprising the steps of:
   decoding an instruction that has a dirty bit register field specifying a selected dirty bit register of the dirty bit registers; and
   in response to the decoding step, storing in the selected dirty bit register a new dirty bit indicating that each operand stored by the one of the multiple corresponding working registers is inactive and no longer needs to be saved to memory at the next context switch of the microprocessor.

* * * * *